United States Patent Office 2,847,042
Patented Aug. 12, 1958

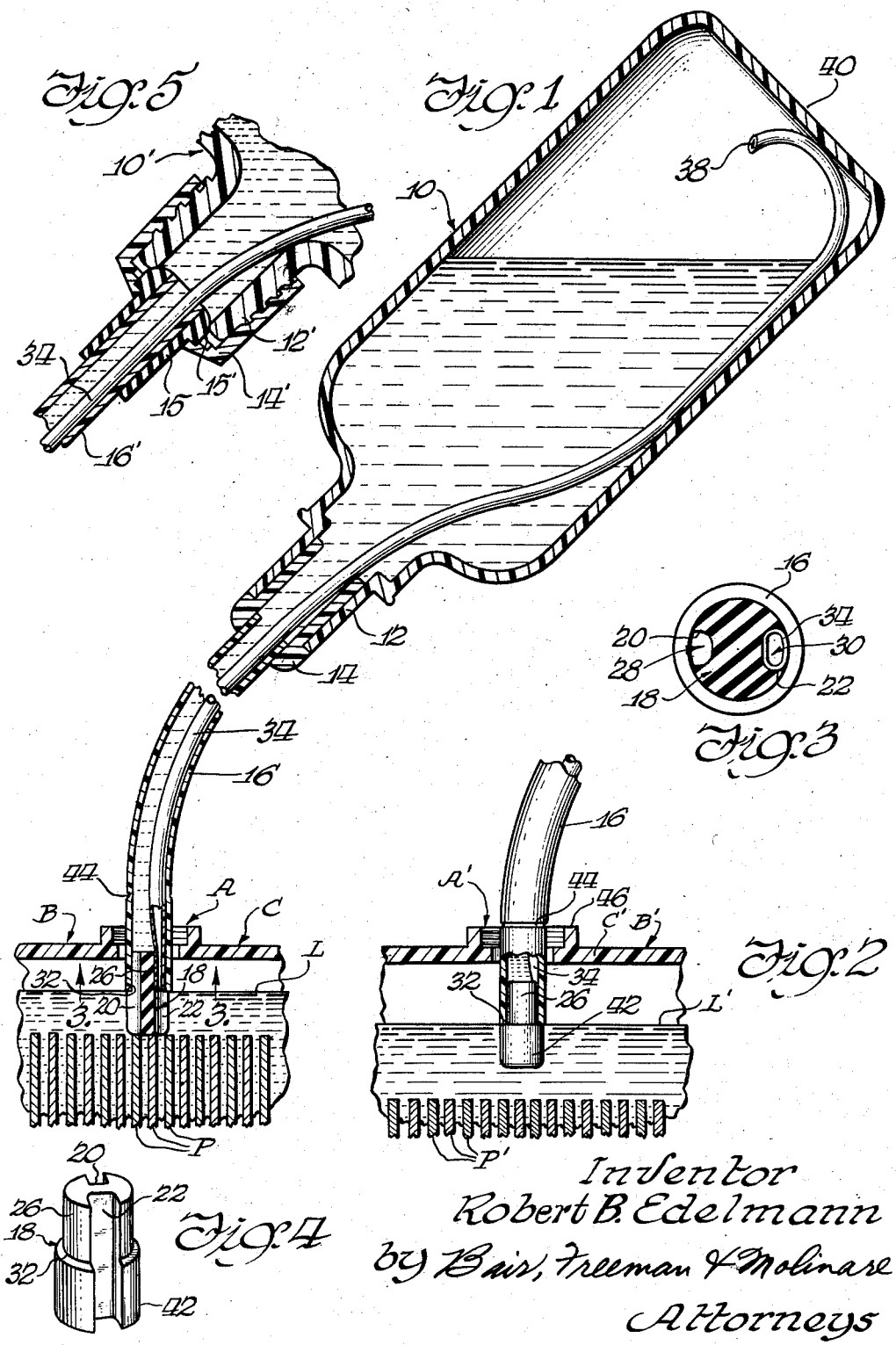

2,847,042
BATTERY FILLER

Robert B. Edelmann, Chicago, Ill., assignor to E. Edelmann & Co., Chicago, Ill., a corporation of Illinois Application April 18, 1955, Serial No. 501,970

5 Claims. (Cl. 141—94)

This invention relates to a dispensing device and more particularly to a liquid dispensing device which is particularly useful for dispensing an acid solution into an automobile storage battery or for replenishing the water of an automobile storage battery.

The loss of water from an automobile storage battery is a serious problem and it is common practice to have the water level of batteries checked whenever automobiles are serviced at a service station.

The replenishing of water to a storage battery has remained, figuratively, in a medieval stage, such replenishment generally being accomplished either by dispensing of water from a long-necked narrow-mouthed bottle, or by way of a rubber syringe having a long dispensing tube extending therefrom.

Both of these instrumentalities are not too effective or efficient, and the presence of chance for human error often results in too little or too much water being dispensed. The dispensing of too much water is a most serious error as the overflow of the highly corrosive acid solution of the battery is very undesirable. The dispensing of too little water results in a reduced output capacity of the battery.

The invention herein is also useful in the filling of "dry" batteries with the acid solutions therefor. Recently, it has been a practice to ship batteries "dry" from their source of manufacture to the distributor or dealer. By shipping "dry" is meant that the battery casing with plates is shipped without any acid solution therein. The distributor or dealer who receives the "dry" battery then fills the battery with the acid solution.

Of course, the distributor, or dealer, when filling a "dry" battery is confronted substantially with the same problem that exists with the adding of water to batteries which are low on water. The person filling the "dry" battery with an acid solution must insure that the acid solution is dispensed to the proper level of solution desired.

It is an object of this invention to provide a novel battery filling instrumentality that practically eliminates the possibility of dispensing too much liquid therefrom and insures the dispensing of either sufficient acid solution or sufficient water therefrom to cover the plates of the battery which is being filled.

Another object of this invention is to provide a battery filling instrumentality which is operative to automatically shut off the flow of liquid therefrom upon the water in the battery attaining the predetermined desired level.

A further object of this invention is to provide a battery filling instrumentality that is characterized by its simplicity and inexpensiveness of construction, and by its efficiency and reliability of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a cross-section view of the battery filler of this invention shown in a liquid dispensing attitude for dispensing of liquid to one of two popular types of batteries;

Figure 2 is a fragmentary view showing the relationship of parts when the device of Figure 1 is dispensing liquid to the second of said two types of batteries;

Figure 3 is an enlarged cross-section view taken on line 3—3 of Figure 1;

Figure 4 is an enlarged perspective view of the nozzle-plug member which is mounted at the discharge end of the dispensing tube of the battery filler of this invention; and Figure 5 is a fragmentary view of a typical adaptation of this invention to a bottle of the type adapted to contain therein an acid solution which is used in the filling of "dry" batteries.

Referring now to the drawings, there is shown a container, or reservoir, for the liquid to be dispensed shown in the form of a jar, or bottle, 10 having a constricted neck 12. The bottle is made of a resilient deformable plastic. There is an annular fitting 14 that is press fitted into neck 12. The stopper 14 carries an elongated dispensing tube 16 which is preferably made of a transparent plastic or the like. The dispensing tube 16 communicates with the interior of the jar 10.

The tube 16, at the extended end thereof, is bent or curved as shown so that the longitudinal axis of the jar 10 may be held at an angle of about 60 degrees to the horizontal, in the manner as shown in Figure 1, when the dispensing end of the tube 16 points straight down.

A nozzle-plug member generally indicated at 18 is mounted in the discharge end of tube 16. Plug 18 is shaped to define, at least partially, a plurality of axially extending passageways. As shown, plug 18 is formed with axially extending arcuate grooves 20, and 22 in the periphery thereof. Plug 18 has a reduced portion 26 which is press-fitted snugly into tube 16. The walls of the grooves 20 and 22 cooperate with the inner wall of tube 16 to define a plurality of passageways 28 and 30 communicating with the interior of the tube 16. Plug 18 is formed with the shoulder 32 for engaging the terminal edge of tube 16 to form a neat and snug connection, and to limit the extent to which plug 18 is inserted into dispensing tube 16. It will be noted that the fully formed passageways 28 and 30 thus terminate at the extended terminal end of dispensing tube 16.

An air-bleed tube 34 is provided which communicates at one end with said passageway 30, defined between groove 22 and tube 16, and being free at its other end. The air-bleed tube is preferably formed of a plastic deformable material. In actual construction one terminal end of air-bleed tube 34 is deformed and snugly inserted into passageway 30 as best seen in Figures 1 and 3, and may be bonded in position by appropriate bonding material such as glue or some other suitable plastic bonding material. The terminal end of air-bleed tube 34 registers with the terminal end of dispensing tube 16.

The air-bleed tube 34 is of smaller diameter than the inside dimension of dispensing tube 16. The air-bleed tube 34 runs through the length of dispensing tube 16 into the jar 10, and is of such a length that, at a point adjacent its free end 38, it engages the bottom wall 40 of jar 10. As related to the dispensing end of the tube 16, the air-bleed tube 34 should be long enough to engage the wall of the liquid reservoir, or jar, 10 which is located substantially opposite the discharge end of tube 16. The plastic material, of which air-bleed tube 34 is made, is of sufficient firmness, or rigidity, such that tube 34 substantially maintains the position shown in Figure 1, whether the bottle is right side up or inverted.

When the air-bleed tube is of the length specified so that it assumes the position shown in Figure 1 when the battery filler is up-ended, then the free end of said air-bleed tube is in communication with the air space in the interior of the reservoir, which is at a point adjacent the uppermost regions of the reservoir when the reservoir is in the dispensing position. This is desirable as it provides for proper bleeding of air into the reservoir as liquid is being dispensed from said reservoir.

Figures 1 and 2 disclose the use of the battery filler with two different types of batteries. In Figure 1, a portion of one type of battery (B) is shown, including a casing (C) having a threaded access opening (A) therein. The interior of the battery includes the battery plates (P) and the desired liquid level within the battery is indicated by (L).

The plug 18 of the battery filler is formed with a feeler portion or stop 42 which extends beyond the terminal end of discharge tube 16 and of passageway 30. The length of the feeler portion or stop 42 is pre-selected in relation to the dimensions of said one type of well known battery, so that when the dispenser is dispensing as shown in Figure 1 with the stop 42 in engagement with the top of plates (P) in the battery (B), then the liquid being dispensed from the battery filler will rise to a level designated at (L) which is the desired pre-selected height of liquid above the top of the plates (P). Liquid continues to be dispensed through the passageway 28 as long as air enters through air-bleed tube 34 into the interior of the reservoir, or jar, 10. When the level of the liquid in the battery is high enough to close off the end of the air-bleed tube 34, further dispensing of liquid automatically ceases.

It will be noted that the size of plug 18 and of dispensing tube 16 is of such dimension as to afford unrestricted entrance of the dispensing tube 16 into the access opening (A) of the battery.

In operation, it may be necessary, in initiating dispensing of liquid from said reservoir, to squeeze the plastic jar 10. That is one of the important reasons for having the reservoir 10 constructed of a deformable plastic. Once dispensing has been initiated, it continues automatically until liquid rises to a level where it blocks off the air-bleed tube 34.

From the above description of operation, it will be evident that the device disclosed herein will automatically dispense liquid to a correct pre-selected height of liquid above the upper end of the battery blades. There is no chance of liquid overflowing when being dispensed from this battery filler.

The second type of battery with which this battery filler may be used is of the well known type which provides extra space within the battery so that an excess of liquid may be contained therein, thereby providing for less frequent fillings of said batteries.

In Figure 2, the second type of battery is indicated generally by (B') and the casing thereof is (C'). The access opening is (A'), the battery plates (P'), and the desired level of liquid within the battery is designated by (L'). In order to provide within a single dispensing unit means for utilization with both types of batteries, there is provided, as shown in Figure 1 and Figure 2, a second indicia means which is pre-selected so as to automatically dispense the correct amount of liquid from the battery filler. The second indicia means is a visual one as contrasted to the manual one shown in Figure 1.

There is provided on the neck of dispensing tube 16 an annular groove 44 which may be colored so as to be more readily visible. This groove 44 is adapted to be aligned with the upper edge 46 of the access opening (A') of battery (B'). When so aligned, the spacing of the outlet end of air-bleed tube 34 is at a sufficient height above the upper edge of plates (P') to provide for the automatic dispensing of liquid into the battery to the height (L') which is the desired height of liquid within said battery.

As shown in Figure 5, there is disclosed an adaptation of the invention for use with a wide-mouthed bottle of the type which carries an acid solution for use in filling "dry" batteries. There is shown a bottle, or jar, 10' having a threaded neck 12'. A threaded annular fitting 14' is provided for attachment to the threaded neck 12'. Fitting 14' carries a ferrule 15, of rubber or the like, into which is press fitted a dispensing tube 16'. The ferrule 15 has an annular bead 15' which provides for clamping thereof between the terminal end of neck 12' of jar 10' and fitting 14' to maintain ferrule 15 in position and to provide a seal between ferrule 15 and fitting 14', and between jar 10' and ferrule 15.

The acid solution may be dispensed from plastic type bottles of the type disclosed herein, or from other types and sizes of bottles of resilient material which may be provided with an adaptor to which the dispensing tube and air-bleed tube of this invention may be attached.

Thus, the claims of this invention are not to be limited in any way by the type of liquid that is to be dispensed, but, on the contrary, are to cover dispensing of all types of liquids that may be dispensed by means of the apparatus disclosed and claimed herein.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A battery filler comprising a jar adapted to contain a supply of liquid, a liquid dispensing tube communicating with the interior of said jar and extending from said jar, a plug member mounted in the extended end of said dispensing tube and being shaped to at least partially define a plurality of passageways therethrough, at least one of said passageways being non-circular in cross-section, and an elongated air-bleed tube of resiliently flexible material disposed in said jar and having one end thereof deformed to enter said non-circular passageway and having said deformed end snugly inserted in said non-circular passageway to be frictionally held in position relative to said plug member, said air-bleed tube being of smaller dimension than the inner dimension of said dispensing tube and being of a length to extend from said plug member through said dispensing tube into the interior of said jar and to engage a wall of said jar substatnially opposite the discharge end of said dispensing tube.

2. A battery filler as set forth in claim 1 including visually observable indicia means on said dispensing tube, adapted to be aligned with a portion of a battery to determine the height to which liquid is to be dispensed into a battery by said battery filler.

3. A battery filler as set forth in claim 1 including a stop member extending from the end of said dispensing tube and terminating at a point spaced from the end of the passageway in the plug member which communicates with said air-bleed tube, said stop member adapted to engage the upper edge of a battery's plates to determine the height to which liquid is dispensed into a battery by said battery filler.

4. A battery filler as set forth in claim 1 wherein said flexible air-bleed tube is sufficiently rigid to be maintained in engagement with said wall of the jar opposite the discharge end of the dispensing tube when the jar is up-ended from its normal position to a liquid dispensing position.

5. A battery filler as set forth in claim 1 wherein said jar is made of a resilient manually deformable material, to permit distortion of the jar to initiate dispensing of the liquid therefrom.

References Cited in the file of this patent

UNITED STATES PATENTS

| | | |
|---|---|---|
| 772,707 | Elfstrand | Oct. 18, 1904 |
| 1,285,074 | Draper | Nov. 19, 1918 |
| 1,745,011 | Frejacques | Jan. 28, 1930 |
| 2,680,773 | Rappuhn | June 8, 1954 |